United States Patent [19]

Oshima et al.

[11] Patent Number: 4,483,179
[45] Date of Patent: Nov. 20, 1984

[54] METHOD OF AND DEVICE FOR DETECTION OF KNOCKING FOR INTERNAL COMBUSTION ENGINE

[75] Inventors: Yujiro Oshima; Kiyokazu Asai, both of Nagoya; Hiroharu Tokoro, Kariya, all of Japan

[73] Assignee: Kabushiki Kaisha Toyota Chuo Kenkyusho, Aichi, Japan

[21] Appl. No.: 326,524

[22] Filed: Dec. 2, 1981

[30] Foreign Application Priority Data

Dec. 3, 1980 [JP] Japan ............................. 55-171335
Feb. 27, 1981 [JP] Japan ............................. 56-27862
Jun. 19, 1981 [JP] Japan ............................. 56-95592

[51] Int. Cl.$^3$ ............................................. G01L 23/22
[52] U.S. Cl. .................................................. 73/35; 73/714
[58] Field of Search .................... 73/35, 714, 649, 721, 73/727, 702

[56] References Cited

U.S. PATENT DOCUMENTS

| | | | |
|---|---|---|---|
| 2,403,774 | 7/1946 | Whitty et al. | 73/35 |
| 2,534,276 | 12/1950 | Lancor | 73/35 |
| 3,149,488 | 9/1964 | Castro | 73/727 X |
| 4,153,020 | 5/1979 | King et al. | 73/35 |
| 4,266,421 | 5/1981 | McDougal | 73/35 X |
| 4,275,586 | 6/1981 | Gast et al. | 73/35 |
| 4,299,117 | 11/1981 | Andrews et al. | 73/35 |
| 4,341,189 | 7/1982 | Yamaguchi et al. | 73/35 X |

Primary Examiner—James J. Gill
Attorney, Agent, or Firm—Mason, Fenwick & Lawrence

[57] ABSTRACT

A method and device for detection of knocking in an internal combustion engine which can not only detect knocking but also an abnormal condition of a cooling liquid in a liquid cooled engine. The device detects the vibration or pressure fluctuations of the cooling liquid generated by both knocking and the operating of the coolant pump.

27 Claims, 11 Drawing Figures

METHOD OF AND DEVICE FOR DETECTION OF KNOCKING FOR INTERNAL COMBUSTION ENGINE

BACKGROUND OF THE INVENTION

This invention relates to a method of and a device for detection of knocking for an internal combustion engine. In an internal combustion engine, in order to prevent the power-loss and the increased fuel comsumption and noise due to an abnormal combustion of the fuel inside the combustion chamber, it is customary to detect the generation of knocking and adjust atomatically the ignition timing or the fuel-injection timing of a sparkplug ignition engine or the fuel-injection timing of a compression ignition engine to just before the generation of knocking or to the state of very low knocking; that is to adjust the ignition timing automatically to the ideal timing. And, in the past, in detecting the generation of knocking, a resonance type vibrometer which was usually called a knock sensor was attached on a cylinder block to detect the vibration inside the cylinder block generated by the knocking inside the combustion chamber of the cylinder block. However, there are many other sources of vibration from knocking on an engine block which comprises of a cylinder block and a cylinder head which are connected to each other such as cams, valves, bearings, and others. The vibration generated by knocking which is called the signal and the vibration generated by other which is called the noise are mixed together, and the knock sensor not only detects the signal, S, but also the noise, N, as well, and a high value of SN ratio can not be obtained. In order to increase the SN ratio, it is necessary to design the engine block to have a natural frequency which is quite different from the frequency of knocking. However, it is extremely difficult to establish a natural frequency accurately because it is difficult to obtain very accurate finish dimensions such as the wall thickness since block is usually made out of iron casting or aluminum casting. Therefore, in the previous methods of knocking detection, the ratio of SN was low, the accuracy of knocking detection was low, and it was difficult to control the ignition timing or the fuel-injection timing accurately.

SUMMARY OF THE INVENTION

It is an object of the invention to provide a method of and a device for detection of knocking for a water-cooled internal combustion engine with improved accuracy of knocking detection.

Another object of the invention is to provide a device for detection of knocking for a water-cooled internal combustion engine which can also detect abnormal conditions of the cooling water.

The inventors of the present invention investigated the method of transmission for the vibration caused by knocking, the signal, and the vibration caused by others, the noise, in a water-cooled internal combustion engine in detail and discovered the following facts.

(1) The signal generated inside the combustion chamber is transmitted to the surrounding wall which forms the combustion chamber first, and then through the top plate and the bottom plate each of which is connected to the top opening and the bottom opening of the cylinder, and finally to the external wall of the cylinder block on which the knock sensor is fixed, as estimated previously. On top of the above estimated transmission path, another path was confirmed in which the signal is transmitted to the cooling water inside the water jacket which is formed between the surrounding wall of the cylinder and the external wall of the cylinder block after being transmitted to the surrounding wall of the cylinder, and the signal is then transmitted to the external wall of the cylinder block. The surrounding wall of the cylinder between the combustion chamber and the water jacket vibrates by the knocking inside the combustion chamber and its vibration fluctuates the volum of the water jacket. Thus, the cooling water inside the water jacket vibrates or its pressure fluctuates.

(2) On the other hand, the noise is transmitted from its source through the top plate or the bottom plate of the cylinder block or through the cooling water inside the water jacket to the external wall of the cylinder block. But, since the noise is not the kind of vibration which fluctuates the volume of the water jacket unlike the signal or the amount of strain in the materials next to the water jacket caused by the noise is considerably smaller than the amount of strain in teh surrounding wall of the cylinder caused by the signal, the transmissibility of the noise to the cooling water inside the water jacket is considerably smaller than the transmissibility of the signal to the cooling water inside the jacket or the transmissibility of the noise to the external wall of the cylinder block. Thus, the noise is only transmitted to the cooling water of the water jacket in a negligible amount.

The present invention has been completed based on the above studies.

The method of detection of knocking provided by this present invention for a water-cooled internal combustion engine in which the combustion chamber and the water jacket are separated by the cylinder detects the vibration or the fluctuation of the pressure of the cooling water inside the water jacket which is generated by knocking inside the combustion chamber and transmitted through the cylinder.

In this method of detection, since it detects the vibration or the pressure fluctuation of the cooling water inside the water jacket in which there is almost no noise, the ratio of SN and the accuracy of knocking detection of this method are much higher than those of the previous method in which the vibration in the external wall of the cylinder block which contains a large amount of noise is detected, as can be seen from results of the above studies.

The device for detection of knocking provided by this present invention for a water-cooled internal combustion engine in which the combustion chamber and the water jacket are separated by the cylinder and a cooling-water path is connected to the water jacket has a vibration pick-up of a vibrometer to detect the vibration being vibration-isolated from the engine block and being faced to the water jacket in which the cooling water is made to vibrate by the knocking inside the combustion chamber through the cylinder or being faced to the cooling-water path to which the same vibration is transmitted.

Since the vibration pick-up of the vibrometer of this device is vibration-isolated from the engine block and being faced to the water jacket or the cooling-water path, the vibrometer can detect the vibration of the cooling water inside the water jacket without detecting the vibration of the engine block. Therefore, this device can be used in the above method of detection of knocking and can detect the knocking with a high degree of accuracy.

Another device for detection of knocking provided by this present invention for a water-cooled internal combustion engine in which the combustion chamber and the water jacket are separated by the cylinder and a cooling-water path is connected to the water jacket has a pressure gauge being connected to the water jacket in which the pressure of the cooling water is made to fluctuate by the knocking inside the combustion chamber through the cylinder or being connected to the cooling-water path to which the same pressure fluctuation is transmitted.

Since the pressure gauge of this device is connected to the water jacket or the cooling-water path, it can detect the pressure fluctuation of the cooling water inside the water jacket. Therefore, this device can be used in the above method of detection of knocking and can detect the knocking with a high degree of accuracy. And, a pressure gauge is used as the knock sensor instead of a vibrometer and it is not necessary to vibration-isolate between the knock sensor and the engine block. Thus, the method of mounting the knock sensor is simpler than the above device for detection of knocking.

Then, the inventors of the present invention investigated how the pressure of the cooling water inside the water jacket of a water-cooled internal combustion engine is fluctuated in details and found out the followings.

(3) When knocking takes place inside a combustion chamber, the top face of the piston which slides inside the combustion chamber vibrates, the piston is pressed against the cylinder by slapping during the expansion stroke passing after the top dead center, the vibration of the top face of the piston is transmitted to the thrust side of the cylinder to which the piston is being pressed, the thrust side of the cylinder vibrates hard with the frequency in accordance with the pressure-vibration by the knocking inside the combustion chamber and produces strain, and a large fluctuation of pressure is generated in the cooling water in contact with the cylinder on the thrust side inside the water jacket.

However, when the degree of knocking is high and the amount of vibration generated by the top face of the piston is large, the cylinder vibrates not only on the thrust side but all the way round including the anti-thrust side.

(4) On the other hand, during the expansion stroke in which the knocking takes place, the vibration of the top face of the piston generated by the knocking is not transmitted directly to the anti-thrust side of the cylinder on which the piston is not slapped, the anti-thrust side of the cylinder does not vibrate as much as the thrust side, and therefore the cooling water which makes contact with the anti-thrust side of the cylinder inside the water jacket does not produce as much fluctuation as the water which is in contact with the thrust side of the cylinder.

(5) The pressure vibration wave generated by the strain vibration of the cylinder due to knocking of the cooling water inside the water jacket has a high frequency of 6 to 15 KHz and has a higher linearity than pressure vibration waves with lower frequencies.

The device for detection of knocking provided by this present invention has been completed based on the results of the above studies and has a a pressure gauge connected to the water jacket on the thrust side on which the piston is slapped during the expansion stroke in order to detect the pressure fluctuation generated in the cooling water in the water jacket due to the knocking in the combustion chamber and transmitted through the cylinder.

Since this device has the pressure gauge to detect the pressure fluctuation of the cooling water due to knocking connected into the water jacket on the side with a larger pressure fluctuation of the cooling water due to knocking, as can be seen from the results of the studies discussed above, it has a higher degree of accuracy in knocking detection compared to the same device connected to the water jacket on the opposite side.

Another device for detection of knocking provided by this present invention has been completed and has the pressure pick-up of a pressure gauge to detect the pressure fluctuation generated in the cooling water in the water jacket due to the knocking in the combustion chamber and transmitted through the cylinder extruding inside the cooling water in the water jacket.

Since this device has the pressure pick-up of the pressure gauge to detect the pressure fluctuation of the cooling water due to knocking extending inside the cooling water in the water jacket, the pressure pick-up of the pressure gauge can detect the pressure vibration wave of the cooling water due to knocking which has a high linearity with a high degree of accuracy, as can be seen from the results of the studies noted above. It has a higher degree of accuracy in detecting the knocking than the case in which the pressure pick-up of the pressure gauge is not extending in the cooling water of the water jacket. And, since the pressure pick-up of the pressure gauge is cooled by the cooling water inside the water jacket, the temperature of the pressure pick-up of the pressure gauge does not exceed the temperature of the cooling water even if the surrounding temperature of the internal combustion engine gets very high.

Yet another device for detection of knocking provided by this present invention is modified from the above device and has the pressure pick-up of a pressure gauge to detect the pressure fluctuation generated in the cooling water in the water jacket due to the knocking in the combustion chamber and transmitted through the cylinder being fitted inside a fixing hollow having an opening diameter which is larger than the depth formed on the side wall of the water jacket.

Since this device has the pressure pick-up of the pressure gauge being fitted inside the fixing hollow formed on the side wall of the water jacket, the pressure pick-up of the pressure gauge can be fitted extending inside the cooling water of the water jacket even when the space of the water jacket between the cylinder and the side wall of the water jacket is small and the pressure pick-up of the pressure gauge can not be made to extend inside the cooling water in the water jacket. And, since the opening diameter of the fixing hollow in which the pressure pick-up of the pressure gauge is fitted is larger than the depth, the pressure vibration wave of the cooling water generated by the knocking which has a high linearlity can enter inside the fixing hollow easily and the pressure pick-up of the pressure gauge can detect the pressure vibration wave of the cooling water generated by the knocking with a high degree of sensitivity. As a result, even when the space of the water jacket between the cylinder and the side wall of the water jacket is too small to receive the pressure pick-up of the pressure gauge, the pressure pick-up of the pressure gauge can be extruded in the cooling water of the water jacket to increase the degree of accuracy in detecting the knocking and the pressure pick-up of the pressure gauge can be cooled by the cooling water of the water jacket at the same time.

Then, the inventors of the present invention further investigated the pressure fluctuation of the cooling water inside the water jacket and the cooling water path in details in water-cooled gasoline engines for automobiles and found out the following.

(6) When a water pump provided in the cooling water path is operating, pulsation is generated inside the cooling water of the water jacket and the cooling water path by the water pump and usually pressure vibration of low frequency under 1 KHz is formed; the frequency may vary slightly according to the shape of the water jacket and the cooling water path or the type of the water pump. The frequency of the pressure vibration is usually equal to the product of the rotational speed per second of the water pump and the number of blades of the water pump.

(7) When the knocking takes place in the combustion chamber, pressure fluctuation of the cooling water of the water jacket and the cooling water path is generated by the knocking transmitted through the cylinder, pressure vibration of high frequency from 6 KHz to 15 KHz is generated; the frequency may vary slightly according to the shape of the combustion chamber or the temperature and the pressure of the combustion gas.

(8) When the knocking takes place while the water pump is operating, a combustion of pressure vibration of low frequency generated by the water pump and pressure vibration of high frequency generated by the knocking is formed.

(9) If there is no cooling water in the water jacket and the cooling water path, there is no pressure vibration of the cooling water, naturally.

After examining the results of these findings carefully, the inventors of the present invention realized the following facts. In the above device for detecting of knocking, if the output signal of the pressure gauge which detects the pressure fluctuation of the cooling water is separated into the high frequency component of the knocking and the low frequency component of the water pump, the generation of the knocking can be detected by the presence of the high frequency component in the output signal of the pressure gauge and the stoppage of the water pump and the absence of cooling water at the position of the pressure pick-up, or an abnormal condition of the cooling water, can be detected by the absence of the low frequency component of the output signal as well.

The device for detection of knocking which also acts as an abnormal cooling water detecting device provided by this present invention has been succeeded based on the above investigation and examination. That is, for a water-cooled internal combustion engine in which a water jacket is formed outside a cylinder which is forming the combustion chamber and a cooling water path provided with a water pump is connected to said water jacket, a pressure gauge is connected to said water jacket or said cooling water path in which the pressure of the cooling water is made to fluctuate by the knocking generated inside said combustion chamber or by the drive of said water pump of said cooling water path in order to detect the pressure vibration of the cooling water, a knocking detecting filter which passes the high frequency component of the vibration due to the knocking and cuts off the low frequency component of the vibration due to the water pump and an abnormal cooling water detecting filter which passes the low frequency component of the vibration due to the water pump and cuts off the high frequency component of the vibration due to the knocking are connected to said pressure gauge which detects the combined vibration of the pressure vibration of high frequency of the cooling water generated by the knocking and the pressure vibration of low frequency of the cooling water generated by the drive of the water pump.

This device, as made clear by the above explanation, can detect not only the generation of knocking but also an abnormal condition of the cooling water, and since the knocking detecting sensor and the abnormal cooling water detecting sensor are operated by the same pressure gauge, the structure of the device can be made simple.

DETAILED DESCRIPTION OF THE PREFERRED EMBODIMENTS

Figure 1:
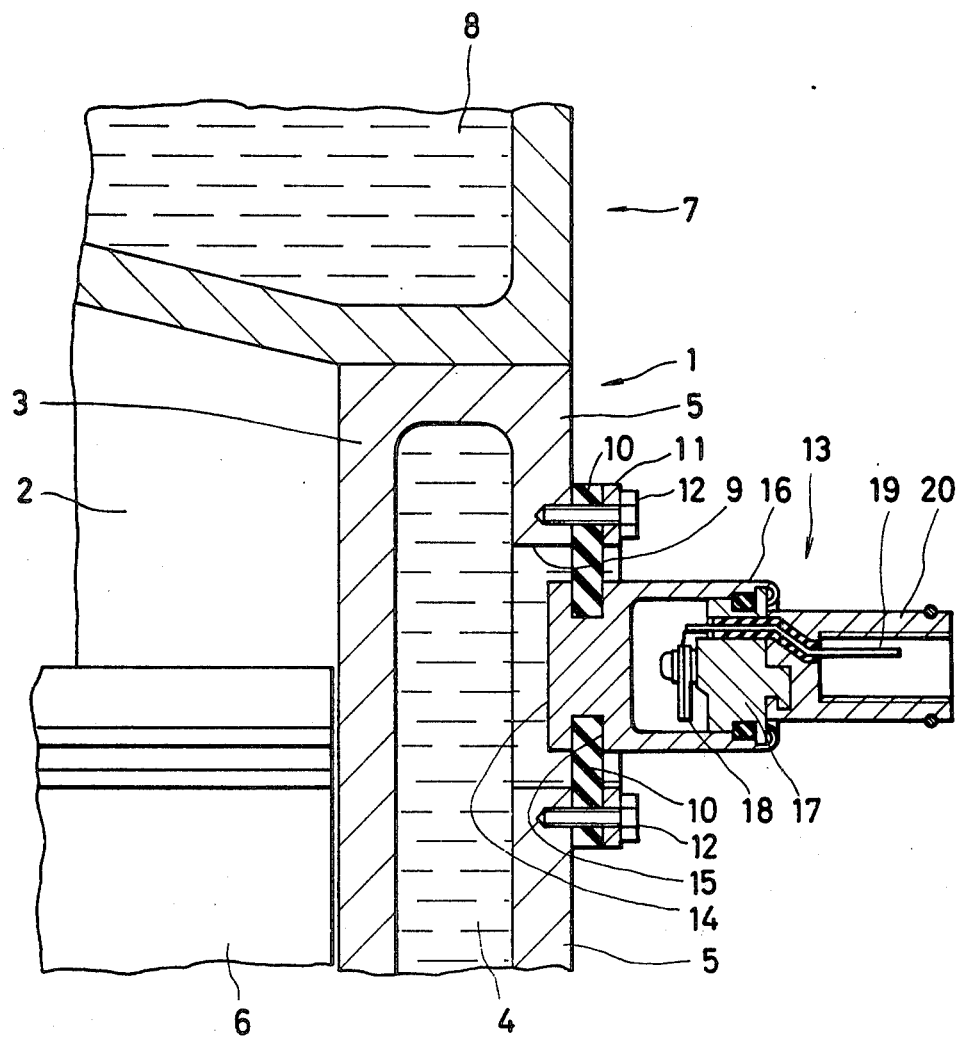
FIG. 1 is a schematic longitudinal sectional view of a device for detection of knocking of the 1st embodiment of the present invention.

First Embodiment (See FIG. 1)

A water-cooled internal combustion engine to which the device for detection of knocking provided by this embodiment is to be mounted is of an automobile gasoline engine having a multiple number of in-line cylinders and has an engine block in which a cylinder head 7 having a water jacket 8 and inlet and exhaust valves which are not shown in the drawing is connected onto a cylinder block 1 having pistons 6 in combustion chambers 2 and a water jacket 4 which surrounds the combustion chambers through cylinders 3; and the water jacket 4 of the cylinder block and the water jacket 8 of the cylinder head which are connected to each other are also connected to a radiator not shown in the drawing through a cooling water path not shown in the drawing. A device for detection of knocking provided by this embodiment comprises a detection hole 9 on an external wall 5 of the cylinder block 1 connecting to the water jacket 4 between the external wall and the cylinder 3, a damper plate 10 in a disk form made out of butyl rubber being mounted on the surrounding edge of the detection hole 9 by fixing the external section of the damper plate with a fixing ring 11 and a multiple number of bolts 12 on the external wall 5 to cover the detection hole 9 by the damper plate 10, a vibration pick-up 14 on the tip of a short cylindrical vibrometer 13 inserted in a through hole at the center of the damper plate 10 by inserting the surrounding edge of the center hole in a fixing groove 15 provided around the vibration pick-up 14, the detection hole 9 being sealed off by damper plate 10 and the vibration pick-up 14, and the vibrometer 13 being mounted on the external wall 5 through the damper plate 10, that is to be vibration-insulated, and the vibration pick-up 14 being faced to the water jacket 4 to make contact with the cooling water of the water jacket. The above vibrometer 13 is of a resonance type using a bimorph cell. A base panel 17 is inserted in an opening of a cylindrical container 16 base of which forms the vibration pick-up 14, and a bimorph cell 18 which is made out of jointing 2 beams made out of piezoelectric elements and supported on one end is mounted parallel to the external wall 5 inside the base plate 17. The natural frequency of the bimorph cell 18 is set equal to the number of vibration of the cooling water inside the water jacket 4 being generated by the knocking inside the combustion chamber 2 and transmitted through the cylinder 3. A terminal 19 which is connected to the electrode of the bimorph cell 18 is extruding inside a connector 20 which is mounted on the external face of the base panel 17.

In a device for detection of knocking provided in this embodiment, when the knocking takes place in the combustion chamber 2, the cooling water inside the water jacket 4 is made to vibrate by the knocking through the cylinder 3, its vibration is received by the vibration pick-up 14, the bimorph cell 18 is put in a resonance, and an output voltage of the bimorph cell 18 is output to the terminal 19.

Since the vibrometer 13 is faced to the water jacket 4 while being vibration-insulated from the engine block 1 and 7, it does not detect the vibration of the engine block 1 and 7 which contains a large amount of noise but detects the vibration of the cooling water inside the water jacket 4 which is almost free of noise. Therefore, the device provided by this embodiment has a high SN ratio and a high degree of accuracy in detecting the knocking. For example, it detects not only the knocking generated in the combustion chamber 2 which is closest to and faced with the vibrometer 13 but also the knocking generated in the combustion chamber which is positioned farthest from the vibrometer 13.

Figure 2:
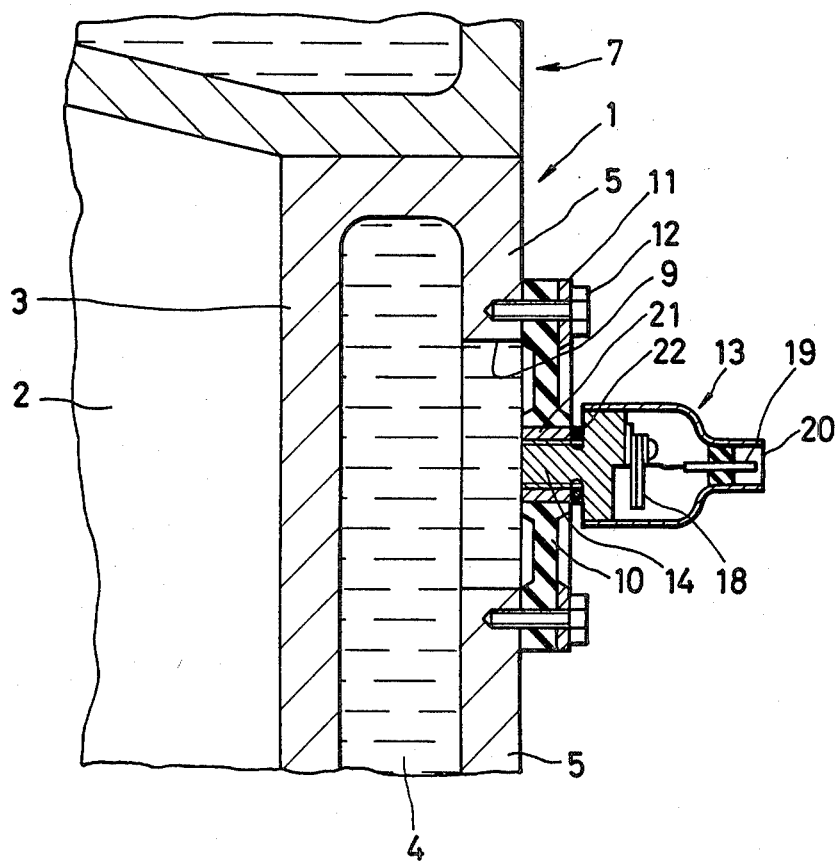
FIG. 2 is a schematic longitudinal sectional view of a device of the 2nd embodiment.

Second Embodiment (See FIG. 2.)

A device for detection of knocking provided by this embodiment has a different method of mounting the vibration pick-up 14 of the vibrometer in the damper plate 10 compared to that of the first embodiment; a nut 21 is inserted in the center hole of the damper plate 10 which is mounted on the outside face of the external wall 5 of the cylinder block, a threaded vibration pick-up 14 of a vibrometer 13 is screwed and tightened in the nut 21 which is faced to the detection hole 9 on the external wall of the cylinder block with a washer 22, the detection hole 9 is sealed by the damper plate 10 and the vibration pick-up 14, a resonance type vibrometer 13 using a bimorph cell 18 is mounted on the external wall 5 through the damper plate 10 to be vibration-insulated, and the vibration pick-up 14 is faced to the water jacket 4 to make contact with the cooling water of the water jacket. Other parts are identical or almost identical to those of the first embodiment and are marked with the same number in FIG. 2 and their explanations are omitted.

Figure 3:
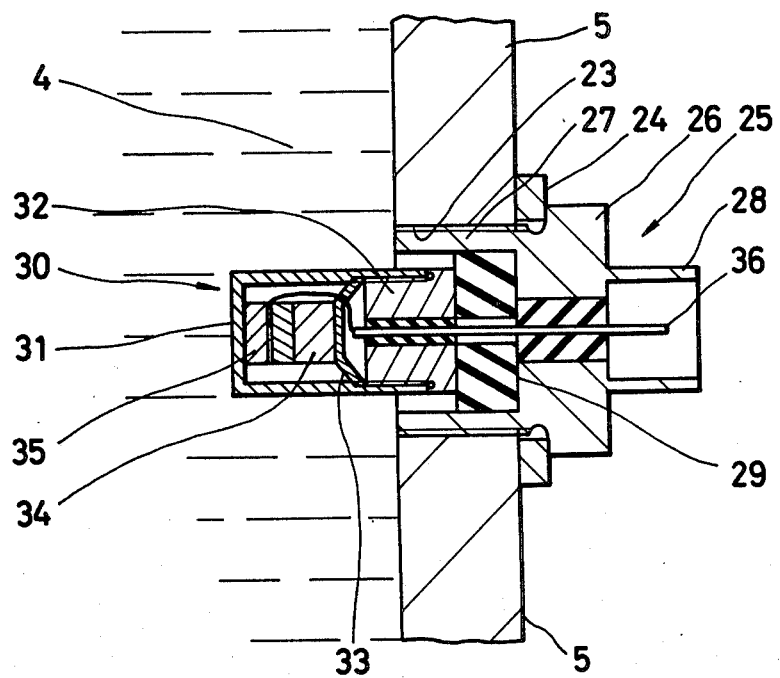
FIG. 3 is a schematic longitudinal sectional view of a device of the 3rd embodiment.

Third Embodiment (See FIG. 3.)

A device for detection of knocking provided by this embodiment comprises a threaded detection hole 23 on the external wall 5 of the cylinder block connecting to the water jacket 4 between the external wall and the cylinders, a fixing threaded section 27 at the front of a housing 26 for a vibrometer 25 being screwed and tightened in the detection hole 23 with a washer 24, and the detection hole 23 is sealed with a vibrometer 25, and the housing 26 is mounted on the external wall 5, and a vibration pick-up 30 which is vibration-insulated from the housing 26 by damping material 29 is positioned in the water jacket 4 to be faced to the water jacket to make contact with the cooling water of the water jacket.

The above vibrometer 25 is of a non-resonance type accelerometer and the damping material 29 in a disk form made out of synthetic rubber is inserted and fixed at the bottom section of the cylindrical fixing threaded section 27 at the front of the housing 26, a vibration pick-up 30 in which a base panel 32 is screwed in the opening of a water-proof case 31 in the form of a cylindrical container is fixed on the plate face of the damping material 29, a spring 33 and a weight 34 which construct the vibration system are housed inside the water-proof case 31 which is sealed by the base panel 32, piezoelectric elements 35 are provided inside the water-proof case 31 to detect the vibration of the weight 34, and a terminal 36 which is connected to the electrode of the piezoelectric elements 35 is positioned inside a connector 28 at the back of the housing 26.

In a device of this embodiment, when the knocking takes place in the combustion chamber, the cooling water inside the water jacket 4 is made to vibrate by the knocking transmitted through the cylinder, its vibration is received by the vibration pick-up 30 which is vibration-isolated from the external wall 5, the vibration system 33 and 34 of the vibration pick-up vibrates, and an output voltage from the piezoelectric elements 35 is output to the terminal 36.

Figure 4:
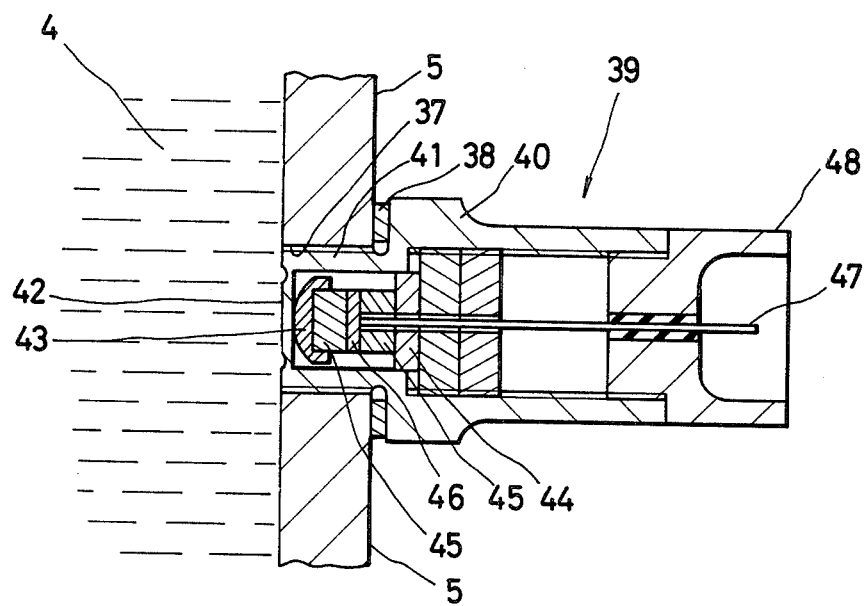
FIG. 4 is a schematic longitudinal sectional view of a device of the 4th embodiment.

Fourth Embodiment (See FIG. 4.)

A device for detection of knocking provided by this embodiment comprises a through threaded detection hole 37 on the external wall 5 of the cylinder block connecting to the water jacket 4 between the external wall and the cylinder, a fixing threaded section 41 at the front of a housing 40 of a pressure gauge being screwed and tightened in the detection hole 37 with a washer 38, and the detection hole 37 is sealed by the pressure gauge, and the pressure gauge 39 is mounted on the external wall 5, and a pressure plate 42 at the tip of the pressure gauge 39 is faced to the water jacket 4 to make contact with the cooling water of the water jacket. The above pressure gauge 39 connected to the water jacket 4 has a pressure transmitting member 43 which makes contact with the back face of the pressure plate 42 at the tip of the housing 40 and two piezoelectric elements 45 having an electrode 46 between them which are positioned between the pressure transmitting member 43 and the base plate 44 supported in the housing 40, and a terminal 47 which is connected to the electrode 46 is inside a connector 48 which is screwed in the backend opening of the housing 40.

In a device of this embodiment, when the knocking takes place in the combustion chamber, the pressure of the cooling water in the water jacket 4 is made to fluctuate by the knocking through the cylinder, its pressure fluctuation is received by the pressure plate 42 of the pressure guage, the piezoelectric elements are depressed through the pressure transmitting member 43, and an output voltage of the piezoelectric elements 45 is output from the electrode 46 to the terminal 47.

Fifth Embodiment (See FIG. 5 to FIG. 8.)

Figure 5:
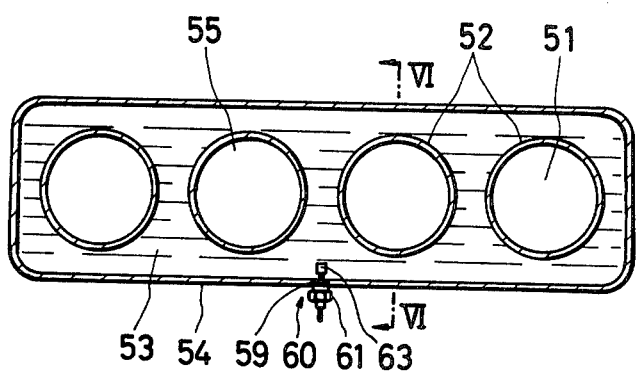
FIG. 5 is a cross-sectional view of a device of the 5th embodiment.
Figure 6:
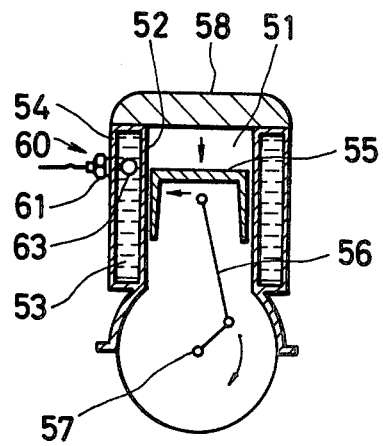
FIG. 6 shows a cross-sectional view along the line VI—VI of FIG. 5.

A water-cooled internal combustion engine to which the device for detection of knocking provided by this embodiment is to be mounted is of an automobile gasoline engine having 4 cylinders positioned in line, as shown in FIG. 5 and FIG. 6. A combustion chamber 51 in which a piston 55 reciprocates is formed in each cylinder 52 and a water jacket 53 in which cooling water flows is formed around each cylinder 52 inside a cylinder block. A cylinder head 58 having inlet and exhaust valves and a water jacket which are not shown in the drawing is connected on top of the cylinder block. A crank room having a crank shaft 57 rotatably mounted is provided under the cylinder block and each crank pin of the crank shaft 57 and the piston pin of each piston 55 are connected by each connecting rod 56.

A device for detection of knocking of this embodiment comprises a through threaded detection hole 59 on the center of the external wall 54 of the cylinder block on the side which forms the water jacket 53 facing to the thrust side of the cylinder 52 on which the piston 55 is pushed against the cylinder wall during the expansion stroke of the above engine by slapping, a threaded fixing section 61 of a pressure gauge 60 being screwed and tightened in the detection hole 59, the detection hole 59 being sealed by the pressure gauge 60, the threaded fixing section 61 being mounted on the external wall 54, a pressure pick-up 63 provided at the tip of the threaded fixing section 61 being extending into the inner wall face of the water jacket 53 or the inside face of the external wall 54 into the water jacket 53 or extending into the cooling water of the water jacket.

Figure 7:
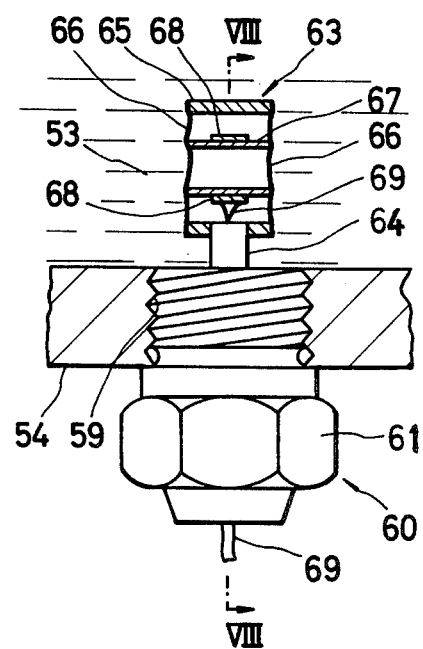
FIG. 7 is an enlarged plan view partially in cross-sectional of a pressure gauge fixing section of the same device.
Figure 8:
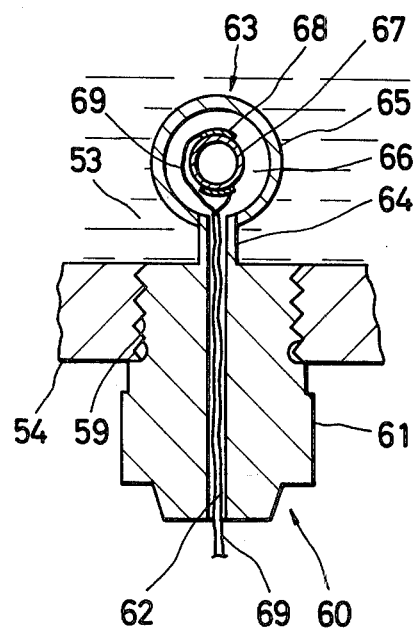
FIG. 8 shows a cross-sectional view along the line VIII—VIII of FIG. 7.

The above pressure pick-up 63 comprises, as shown in FIG. 7 and FIG. 8, a short cylindrical frame pipe 65 being attached at the tip of a fixing section 61 by inserting the tip of a neck 64 extruded on the threaded fixing sectiom 61 in a connection hole provided on the outer wall of the frame pipe 65, two pressure films 66 covering both openings of the frame pipe 65 and a strain pipe 67 supported by the pressure films 66 coaxially inside the frame pipe 65 and a strain gauge 68 attached on the external surface of a strain pipe 67 on which a strain is formed by the pressure applied on both pressure films 66, and a lead wire 69 of the strain gauge 68 being guided to outside through the center hole 62 made through the fixing section 61.

In a device for detection of knocking provided by this embodimet, when the knocking takes place in the combustion chamber 51, the top face of the piston 55 reciprocating inside the combustion chamber 51 is made to vibrate by the knocking, the piston 55 is pressed against the cylinder 52 by slapping in the expansion stroke after the top dead center, the thrust side of the cylinder 52 on which the piston 55 is pressed produces a large vibration and the cooling water inside the water jacket 53 making contact with the thrust side produces a large pressure fluctuation, its large pressure fluctuation is applied on the pressure films 66 to produce a strain on the strain pipe 67, its strain is detected by the strain gauge 68, and thus the generation of the knocking is detected.

Since the device of this embodiment has the pressure gauge 60 being connected to the water jacket on the side with a larger pressure fluctuation of the cooling water due to knocking and has the pressure pick-up 63 extending into the water jacket 53 from the inner wall of the water jacket, it has a high degree of accuracy in detection of knocking. For example, it detects not only the knocking taking place in two combustion chambers 51 at the middle which are close to the pressure gauge 60 but also the knocking taking place in the combustion chambers 51 on both ends which are further from the pressure gauge 60 with a high degree of accuracy.

Since the device for detection of knocking provided by this embodiment has its pressure pick-up 63 extending into the cooling water of the water jacket 53, the pressure pick up 63 is cooled by the cooling water inside the water jacket 53 and the temperature of the pressure pick-up 63 does not exceed the temperature of the cooling water even when the surrounding temperature of the engine gets hot.

Figure 9:
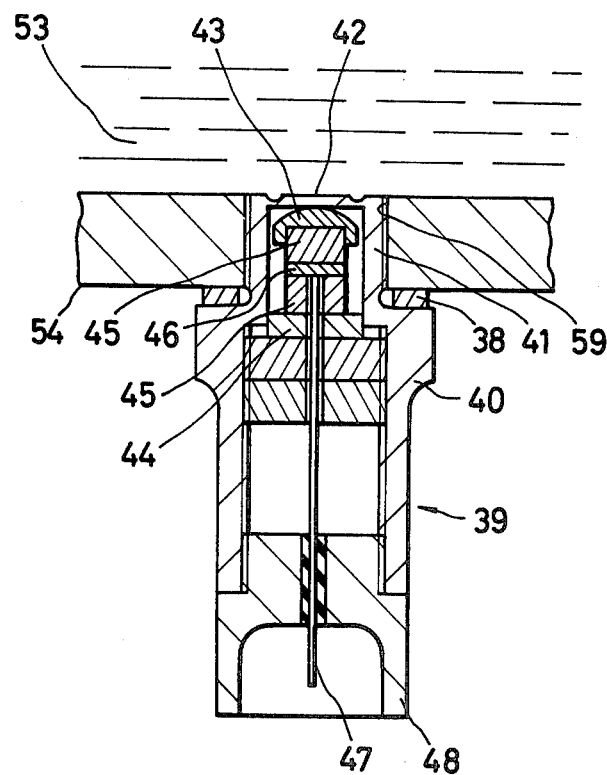
FIG. 9 is a plan view partially in cross-sectional of a pressure gauge fixing section of a device of the 6th embodiment.

Sixth Embodiment (See FIG. 9.)

A device for detection of knocking provided by this embodiment has the following differences compared to the previous embodiment; an engine to which the device is mounted is of a water-cooled gasoline engine with 2 or 3 cylinders, the pressure gauge 39 uses piezoelectric elements similar to the 4th embodiment, the pressure plate 42 forming the pressure pick-up of the pressure gauge is positioned in face with the inner wall of the water jacket and not extruding inside the cooling water in the water jacket 53. Other points are identical to those of the 5th embodiment. A device provided by this embodiment comprises a through threaded detection hole 59 on the center of the external wall 54 of the cylinder block on the side which forms the water jacket 53 facing to the thrust side of the cylinder on which the piston is pushed against the cylinder wall during the expansion stroke of the engine by slapping, a fixing threaded section 41 at the tip of a housing 40 for a pressure gauge 39 being screwed and tightened in the detection hole 59 with a washer 38, the detection hole 59 being sealed by the pressure gauge 39, the pressure gauge 39 being mounted on the external wall 54, and the surface of the pressure plate 42 at the tip of the pressure gauge 39 being aligned in face with the inner surface of the external wall 54 to make contact with the cooling water of the water jacket 53. The above pressure gauge 39 connected to the water jacket 53 has a pressure transmitting member 43 which makes contact with the back face of the pressure plate 42 at the tip of the housing 40 and two piezoelectric elements 45 having an electrode 46 between them which are positioned between the pressure transmitting member 43 and the base plate 44 supported in the housing 40, and a terminal 47 which is connected to the electrode 46 is inside a connector 48 which is screwed in the back-end opening of the housing 40.

In a device of this embodiment, when the knocking takes place in the combustion chamber, the pressure of the cooling water in the water jacket 53 is made to fluctuate largely by the knocking through the cylinder, its pressure fluctuation is received by the pressure plate 42 of the pressure guage, the piezoelectric elements 45 are depressed throuh the pressure transmitting member 43, and an output voltage of the piezoelectric elements 45 is output from the electrode 46 to the terminal 47.

Since the device of this embodiment has the pressure guage 39 being connected to the water jacket 53 on the side with a larger pressure fluctuation of the cooling water due to the knocking, it has a high degree of accuracy in detecting the knocking. Although the pressure pick-up of the pressure gauge 39 does not extend into the cooling water in the water jacket 53, since the engine is of a small sized engine with 2 or 3 cylinders and the distance from the pressure plate 42 of the pressure gauge to each combustion chamber is relatively short, the knocking generated in each combustion chamber can be detected fully by the pressure gauge 39.

Figure 10:
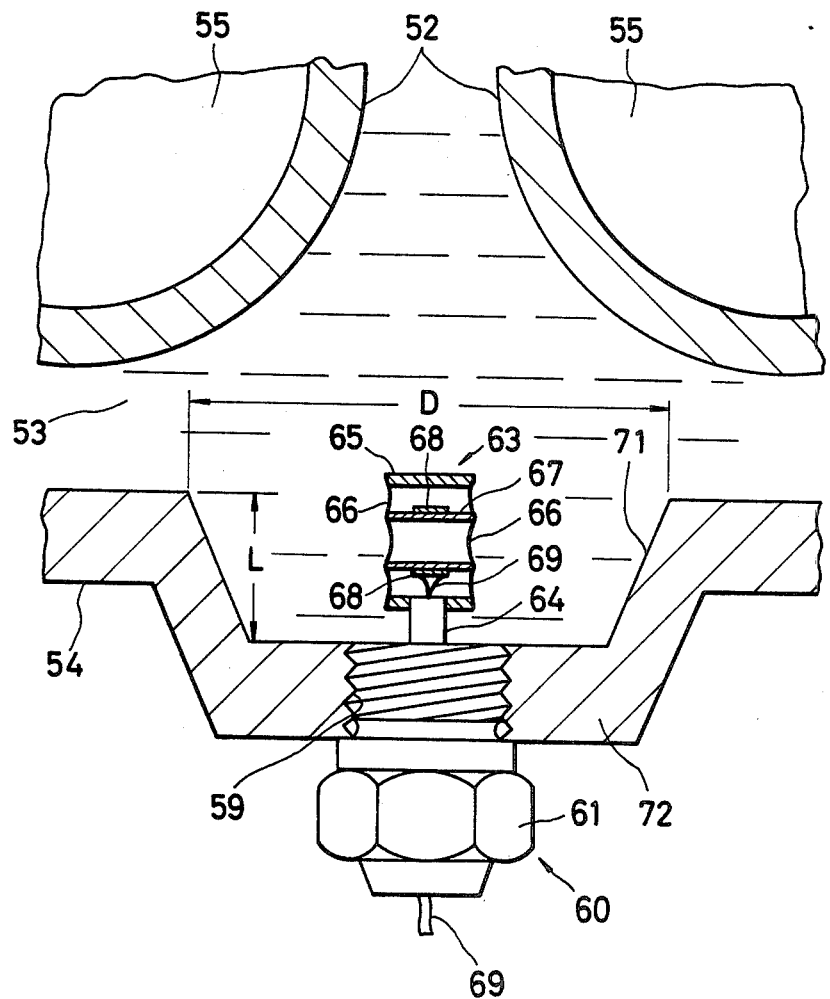
FIG. 10 is a cross-sectional view of a pressure gauge fixing section of a device of the 7th embodiment.

Seventh Embodiment (See FIG. 10.)

A device for detection of knocking provided by this embodiment comprises a wall cavity 71 extending outwardly from water jacket 53 in the form of a large frustum of cone having an opening diameter (D) larger than the depth (L) being formed on the center of the external wall 54 of the cylinder block on the side which forms the water jacket 53 facing to the thrust side of the cylinder 52 on which the piston 55 is pushed against the wall during the expansion stroke of a water-cooled in-line 4-cylinder gasoline engine, and a pressure gauge 60 similar to that of the 5th embodiment being mounted on a bottom plate 72 of the wall cavity in the method similar to that of the 5th embodiment. The parts which are identical to those of the 5th embodiment are marked with the same number in FIG. 10 and their explanations are omitted.

Since the device of this embodiment has the pressure pick-up 63 of the pressure gauge being fixed inside the wall cavity 71 formed on the inner wall of the water jacket 53, the pressure pick-up 63 can be made to extend inside the cooling water of the water of the water jacket 53 even when the space of the water jacket 53 itself is too small to make the pressure pick-up extruded in it. And, since the wall cavity 71 has an opening diameter (D) which is larger than its depth (L), the pressure vibration of the cooling water due to knocking which has a high linearity can enter in the wall cavity 71 easily and the pressue pick-up 63 can detect the pressure vibration wave of the cooling water generated by knocking with a high degree of sensitivity. Since the bottom plate 72 of the wall cavity on which the pressure gauge 60 is mounted is smaller than the side wall of the water jacket 53 or the external wall 54 of the cylinder block and has a high natural frequency which is quite different from the frequency of the knocking, the amount of noise detected by the pressure gauge 60 mounted on the bottom plate 72 is smaller than the amount of noise detected by the pressure gauge mounted on the external wall 54 of the cylinder block as in th case for the 5th embodiment or the 6th embodiment.

When the shape of the opening for the wall cavity 71 is not circular, the opening diameter (D) is calculated as the diameter of acircle having the same area as that of the non-circular opening.

Figure 11:
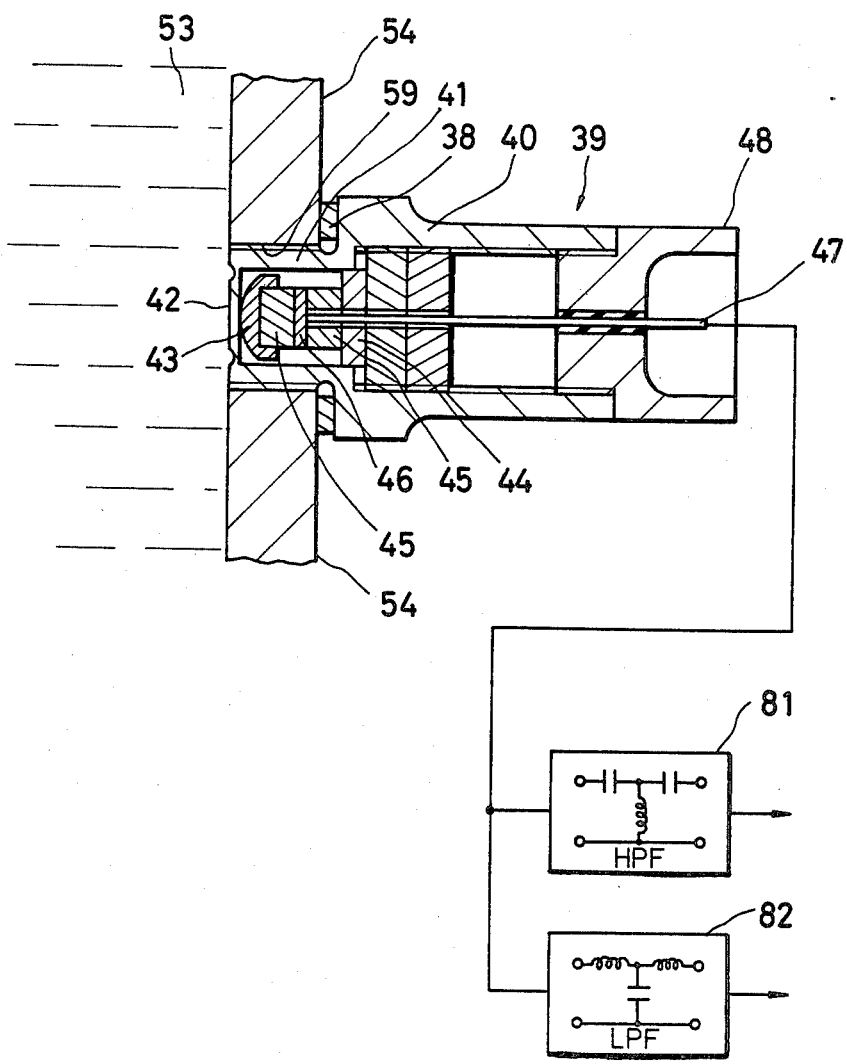
FIG. 11 shows a longitudinal-sectional view of a pressure gauge fixing section and a view of a filter circuit of a device of the 8th embodiment.

Eighth Embodiment (See FIG. 11.)

A device for detection of knocking which also acts as a device for detection of abnormal cooling water provided by this embodiment comprises a pressure gauge 39 similar to that of the 4th embodiment or the 6th embodiment being mounted in the similar way to the center of the external wall 54 of the cylinder block on the side which forms the water jacket 53 facing to the thrust side of the cylinder on which the piston is pushed against the wall during the expansion stroke of a positively water-cooled gasoline engine with a small number of cylinders for automobiles. And, a high-pass filter 81 for detection of knocking and a low-pass filter for detection of abnormal cooling water are connected to the terminal 47 inside the connector 48 of the pressure gauge, and the high-pass filter 81 is connected to a knocking control circuit which is not shown in the drawing and the low-pass filter 82 is connected to an abnormal cooling water warning circuit which is not shown in the drawing. The frequency of the 3 dB damping point is set at 6 KHz for the high-pass filter for detection of knocking which passes a high frequency component in the range of 6 KHz to 15 KHz generated by knocking of the vibration and cuts off a low frequency component in the range under 1 KHz generated by a water pump which is not shown in the drawing. The frequency of th 3 dB damping point is set at 1 KHz for the low-pass filter 82 for detection of abnormal cooling water which passes a low frequency component of the vibration generated by the water pump and cuts off a high frequency component of the vibration generated by knocking.

In the device of this embodiment, when the water pump provided in a cooling water path which is not shown in the drawing and connected to the water jacket 53 is rotating, pressure vibration of low frequency under 1 KHz is generated in cooling water of the water jacket 53 by the rotation of the water pump, its pressure vibration is received by the pressure plate 42 of the pressure gauge, the piezoelectric elements 45 are depressed through the pressure transmitting member 43, an output voltage of the piezoelectric elements 45 is output from the electrode 46 to the terminal 47, and its electrical output signal is input to the high-pass filter 81 for detection of knocking and the low-pass filter 82 for detection of abnormal cooling water. Since the electrical output signal of the pressure gauge 39 contains the low frequency component of under 1 KHz due to the rotation of the water pump, its low frequency component is passed through the low-pass filter 82 for detection of abnormal cooling water and is input into the abnormal cooling water warning circuit, and this circuit stops giving a warning of an abnormal condition taking place for the cooling water. When the rotation of the water pump stops, the pressure vibration of low frequency under 1 KHz which had been generated in the cooling water of the water jacket 53 disappears, the low frequency component contained in the electrical output signal of the pressure gauge 39 due to the rotation of the water pump disappears, there becomes no signal passing through the low-pass filter 82 for detection of abnormal cooling water, and the abnormal cooling water warning circuit issues a warning of an abnormal condition taking place for the cooling water by the disappearance of the input signal. When there is no cooling water making contact with the pressure plate 42, the electrical output signal of the pressure gauge 39 disappears, and the abnormal cooling water warning circuit issues a warning of an abnormal condition taking place for the cooling water by the disappearance of the input signal.

When the knocking takes place in the combustion chamber while the water jacket 53 is filled with cooling water and the water pump is rotating, pressure vibration of high frequency of 6 KHz to 15 KHz is generated in the cooling water of the water jacket 53 due to the generation of the knocking on top of pressure vibration of low frequency under 1 KHz due to the rotation of the water pump, a combined vibration of the low frequency vibration and the high frequency vibration is received by the pressure gauge 39, an electrical output signal of the pressure gauge 39 is input into the high-pass filter 81 for detection of knocking and the low-pass filter 82 for detection of abnormal cooling water, the low frequency component of the electrical output signal of the pressure gauge 39 due to the rotation of the water pump passes through the low-pass filter 82 for detection of abnormal cooling water and is input into the abnormal cooling water warning circuit to stop issuing a warning of an abnormal condition taking place for the cooling water, the high frequency component of the electrical output signal of the pressure gauge 39 due to the knocking passes through the high-pass filter 81 for detection of knocking and is input into the knocking control circuit, and this circuit detects the generation of knocking and controls the ignition timing to prevent the generation of knocking.

As stated above, the device of this embodiment can detect an abnormal condition of the cooling water such as the stoppage of the water pump or the absence of the cooling water as well as the generation of knocking.

In the above embodiment, the T-type filter is shown for the high-pass filter 81 and the low-pass filter 82 in FIG. 11, but, it is clear that the $\pi$-type filter or other types of filters can also be used. A high-pass filter is used for the filter 81 for detection of knocking in this embodiment, however, a band-pass filter which passes the frequency component of the vibration from 6 KHz to 15 KHz due to the knocking and cuts off the frequency components which are higher and lower than its frequency band may be used. When a band-pass filter is used for the filter for the detection of knocking, a frequency component higher than the frequency component of the vibration due to knocking, that is a noise, can be removed. Set the higher 3 dB damping point for the band filter to 15 KHz.

What is claimed is:

1. A device for detection of knocking which also acts as a device for detection of abnormal liquid coolant temperature in a liquid-cooled internal combustion engine in which a water jacket is formed outside a cylinder which is forming a combustion chamber and a coolant path provided with a coolant pump is connected to said water jacket comprising a pressure gauge being connected to said water jacket or said coolant path in which the pressure of coolant is made to fluctuate by knocking generated inside said combustion chamber or by the drive of said coolant pump of said coolant path in order to detect the pressure vibration of said coolant, a knocking detecting filter which passes the high frequency component of the vibration due to knocking and cuts off the low frequency component of the vibration due to said water pump and an abnormal coolant detecting filter which passes the low frequency component of the vibration due to said water pump and cuts off the high frequency component of the vibration due to knocking being connected to said pressure gauge which detects the combined vibration of the pressure vibration of high frequency of said coolant generated by knocking and the pressure vibration of low frequency of said cooling water generated by the drive of said water pump.

2. A device as defined in claim 1 wherein said knocking detecting filter is of a band-pass filter.

3. A device as defined in claim 1 or 2 wherein said internal combustion engine is of an automobile gasoline engine.

4. A device as defined in claim 1 or 2 wherein said pressure gauge is connected to said water jacket facing to the thrust side of said cylinder on which a piston sliding inside said combustion chamber is slapped at the expansion stroke.

5. A device as defined in claim 4 wherein said internal combustion engine is of an automobile gasoline engine.

6. A device for detection of knocking in a liquid-cooled internal combustion engine in which a combustion chamber is provided in a cylinder enclosed in a water jacket inside an engine block, said device comprising a knock sensor mounted on the engine block and connected to coolant fluid in said water jacket in order to detect the vibration or the pressure fluctuation of coolant fluid which is generated by knocking in said combustion chamber through said cylinder, and wherein said knock sensor is positioned to face the thrust side of said cylinder on which a piston sliding inside said combustion chamber is slapped during the expansion stroke.

7. A device as defined in claim 6, wherein said knock sensor is a vibration pick-up of a vibrometer which is mounted on and supported by vibration damping means attached to said engine block and is in contact with coolant fluid in the water jacket for converting vibration of the coolant fluid into an electrical signal.

8. A device as defined in claim 7, wherein said vibrometer is of a resonance type and its natural frequency is equal to the frequency of the vibration of said coolant fluid generated by knocking.

9. A device as defined in claim 8, wherein said vibrometer is equipped with a piezoelectric element which creates electrical signals in response to mechanical vibrations.

10. A device as defined in claim 7, wherein a through detection hole is provided on an external wall of a cylinder block which is a component of said engine block connecting to said water jacket, an external section of a damper plate is fixed on the outer edge of said detection hole, said vibration pick-up is fixed in a through hole on said damper plate, said detection hole is sealed by said damper plate and said vibration pick-up and said vibrometer is fixed on said external wall through said damper plate.

11. A device as defined in claim 10, wherein said vibrometer is of a resonance type and its natural frequency is equal to the frequency of the vibration of said coolant fluid generated by knocking.

12. A device as defined in claim 11, wherein said vibrometer is equipped with a piezoelectric element which creates electrical signals in response to mechanical vibrations.

13. A device as defined in claim 7, wherein a through detection hole is provided on an external wall of a cylinder block which is a component of said engine block connecting to said water jacket, a housing of said vibrometer is fixed in said detection hole, said detection hole is sealed by said vibrometer and said vibrometer is fixed on said external wall, and said vibration pick-up is fixed on said housing through a damping material.

14. A device as defined in claim 13, wherein said vibrometer is of a non-resonance type accelerometer.

15. A device as defined in claim 6, wherein said knock sensor is a pressure gauge.

16. A device as defined in claim 15, wherein a pressure pick-up of said pressure gauge is positioned in said coolant fluid in said water jacket.

17. A device as defined in claim 15, wherein a pressure pick-up of said pressure gauge is fixed inside a hollow outwardly extending cavity in the wall of the water jacket having an opening diameter larger than the depth of said cavity in the inside wall of said water jacket.

18. A device as defined in claim 15, wherein a through detection hole is provided on an external wall of a cylinder block which forms a side wall of said water jacket connecting to said water jacket, said pressure gauge is fixed in said detection hole, said detection hole is sealed with said pressure gauge and said pressure gauge is fixed on said external wall, and a pressure pick-up of said pressure gauge is positioned to make contact with coolant fluid in said water jacket.

19. A device as defined in claim 18, wherein said pressure gauge includes piezoelectric elements which are contacted and depressed by a pressure plate engaged by the coolant fluid.

20. A device as defined in claim 19, wherein a pressure pick-up of said pressure gauge is positioned in said coolant fluid in said water jacket.

21. A device as defined in claim 19, wherein a pressure pick-up of said pressure gauge is fixed inside a hollow outwardly extending cavity in the wall of the water jacket having an opening diameter larger than the depth of said cavity in the inside wall of said water jacket.

22. A device as defined in claim 18, wherein said pressure pick-up comprises pressure films covering openings of a frame pipe on both ends, a strain pipe positioned in aid frame pipe and being supported between said pressure films, and a strain gauge being attached on said strain pipe which is placed in strain by the pressure applied on said both pressure films.

23. A device as defined in claim 22, wherein a pressure pick-up of said pressure gauge is positioned in said coolant fluid in said water jacket.

24. A device as defined in claim 22, wherein a pressure pick-up of said pressure gauge is fixed inside a hollow outwardly extending cavity in the wall of the water jacket having an opening diameter larger than the depth of said cavity in the inside wall of said water jacket.

25. A device as defined in claim 18, wherein a pressure pick-up of said pressure gauge is positioned in said coolant fluid in said water jacket.

26. A device as defined in claim 18, wherein a pressure pick-up of said pressure gauge is fixed inside a hollow outwardly extending cavity in the wall of the water jacket having an opening diameter larger than the depth of said cavity in the inside wall of said water jacket.

27. A device for detection of knocking for a water-cooled internal combustion engine in which a cylinder is separating a combustion chamber and a water jacket and a cooling water path is connected to said water jacket comprising a pressure gauge being connected to said water jacket in which the pressure of cooling water is made to fluctuate by knocking in said combustion chamber through said cylinder or to said cooling water path to which the pressure fluctuation of said cooling water is transmitted in order to detect said pressure fluctuation, wherein said pressure gauge is connected to said water jacket which is faced to the thrust side of said cylinder on which a piston sliding inside said combustion chamber is slapped during the expansion stroke, wherein a through detection hole is provided on an external wall of a cylinder block which forms a side wall of said water jacket facing to the thrust side of said cylinder connection to said water jacket, said pressure gauge is fixed in said detection hole, said detection hole is sealed with said pressure gauge and said pressure gauge is fixed on said external wall, and a pressure pick-up of said pressure gauge is made to make contact with cooling water of said water jacket, and wherein said pressure pick-up comprises pressure films covering both openings of a frame pipe on both ends, a strain pipe positioned in said frame pipe being supported between said pressure films, and a strain gauge being attached on said strain pipe which is made to strain by the pressure applied on said both pressure films.

* * * * *